US011876638B2

(12) United States Patent
See et al.

(10) Patent No.: US 11,876,638 B2
(45) Date of Patent: *Jan. 16, 2024

(54) BRIDGING MESH DEVICE CONTROLLER FOR IMPLEMENTING A SCENE

(71) Applicant: Brilliant Home Technology, Inc., San Mateo, CA (US)

(72) Inventors: Bozhi See, San Mateo, CA (US); Steven Stanek, San Mateo, CA (US); Jeremy Hiatt, San Mateo, CA (US)

(73) Assignee: Brilliant Home Technology, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/939,568

(22) Filed: Sep. 7, 2022

(65) Prior Publication Data

US 2023/0019612 A1 Jan. 19, 2023

Related U.S. Application Data

(63) Continuation of application No. 17/142,151, filed on Jan. 5, 2021, now Pat. No. 11,469,916.

(60) Provisional application No. 62/957,310, filed on Jan. 5, 2020, provisional application No. 62/957,297, filed on Jan. 5, 2020.

(51) Int. Cl.
*H04L 12/28* (2006.01)
*H05B 47/19* (2020.01)
*H05B 47/115* (2020.01)

(52) U.S. Cl.
CPC ........ *H04L 12/282* (2013.01); *H04L 12/2827* (2013.01); *H05B 47/115* (2020.01); *H05B 47/19* (2020.01); *H04L 2012/2841* (2013.01)

(58) Field of Classification Search
CPC .............. H04L 12/282; H04L 12/2827; H04L 2012/2841; H04L 2012/285; H05B 47/115; H05B 47/19
See application file for complete search history.

(56) References Cited

U.S. PATENT DOCUMENTS

2018/0191517 A1* 7/2018 Emigh ................... H05B 45/10
2018/0300645 A1* 10/2018 Segal ....................... G06N 7/02

* cited by examiner

*Primary Examiner* — Tejal Gami
(74) *Attorney, Agent, or Firm* — Mahamedi IP Law LLP

(57) ABSTRACT

A device controller can communicate with a local network of devices and one or more intermediary devices for transmitting scene commands for implementation of a scene. The device controller may create a mesh bridge with the one or more intermediary devices to establish a communication link with a controlled device and generate and transmit a set of one or more scene commands via the mesh bridge to the controlled device to execute the scene.

20 Claims, 8 Drawing Sheets

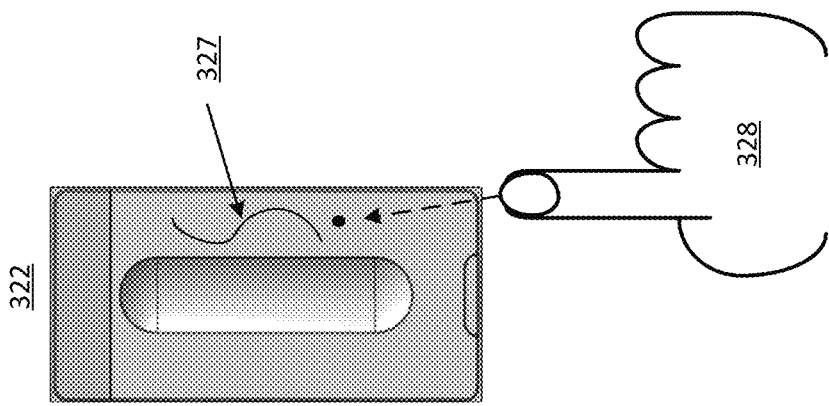
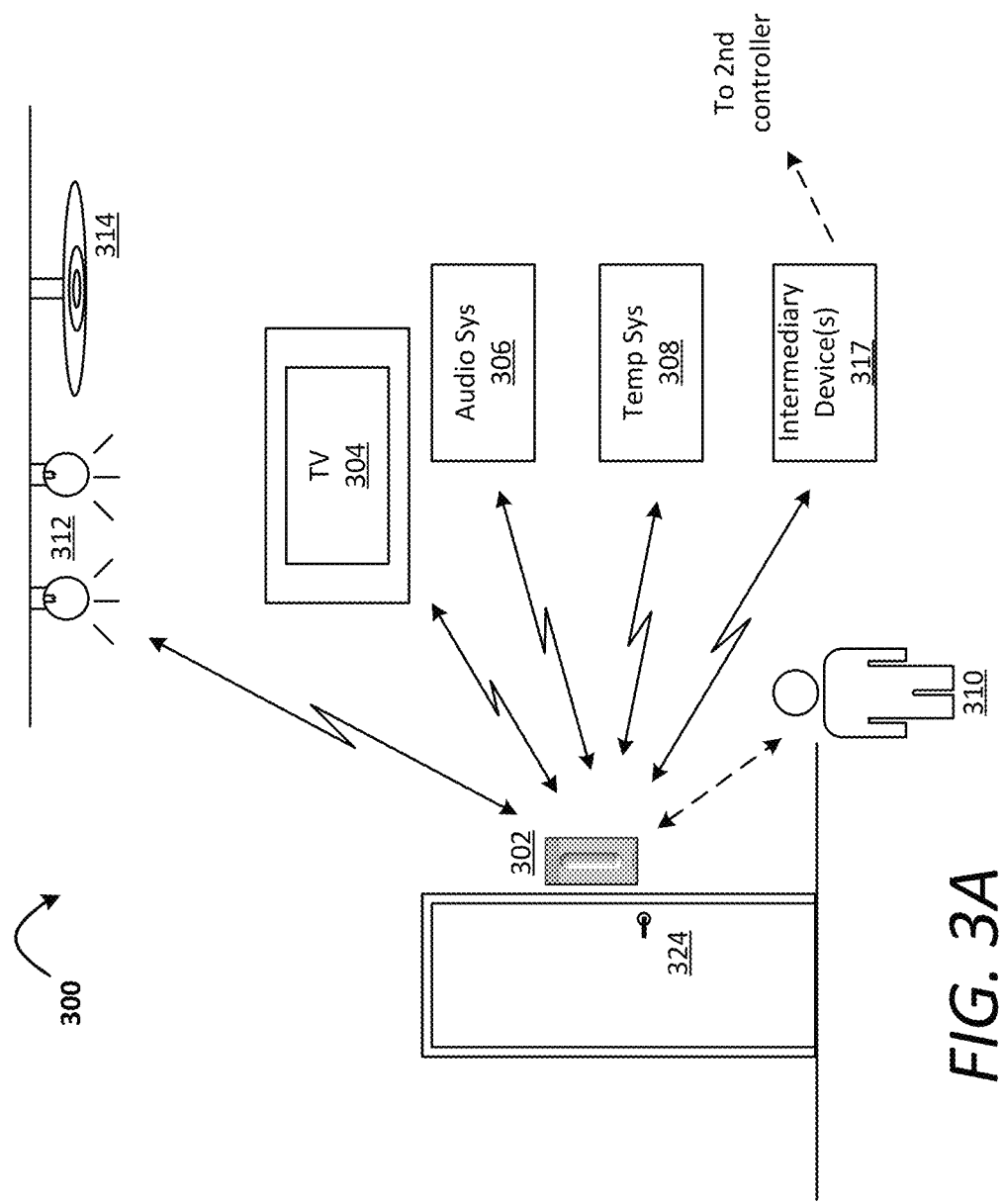

BRIDGING MESH DEVICE CONTROLLER FOR IMPLEMENTING A SCENE

RELATED APPLICATIONS

This application is a continuation of U.S. patent application Ser. No. 17/142,151, filed on Jan. 5, 2021; which claims benefit of priority to (i) Provisional U.S. Patent Application No. 62/957,310, filed Jan. 5, 2020; and (ii) Provisional U.S. Patent Application No. 62/957,297, filed Jan. 5, 2020. Each of the aforementioned applications are hereby incorporated by reference in their respective entireties.

TECHNICAL FIELD

This application relates to device controllers, and more specifically, bridging mesh device controller for implementing a scene.

BACKGROUND

Home control systems, such as lighting control systems used for lighting fixtures, include binary analog switches and analog dimmer switches that enable users to control one or more lights wired to an electrical box upon which such switches are connected. Furthermore, when a person wishes to activate or interact with home systems, the person typically must interact with an actual device of the system or a dedicated or universal remote control and manually create an environment comprising activated or dimmed lights, audio system output, visual system output (e.g., a television or digital picture frame output), temperature, and the like.

BRIEF DESCRIPTION OF THE DRAWINGS

The disclosure herein is illustrated by way of example, and not by way of limitation, in the figures of the accompanying drawings in which like reference numerals refer to similar elements, and in which:

FIG. 3A illustrates a smart home environment in which an example scene is generated in accordance with various aspects described herein;

FIG. 3B illustrates an example gesture performed by a user on a device controller to implement a scene for a local network of smart devices operated by a second device controller, according to various examples;

DETAILED DESCRIPTION

Figure 1A:
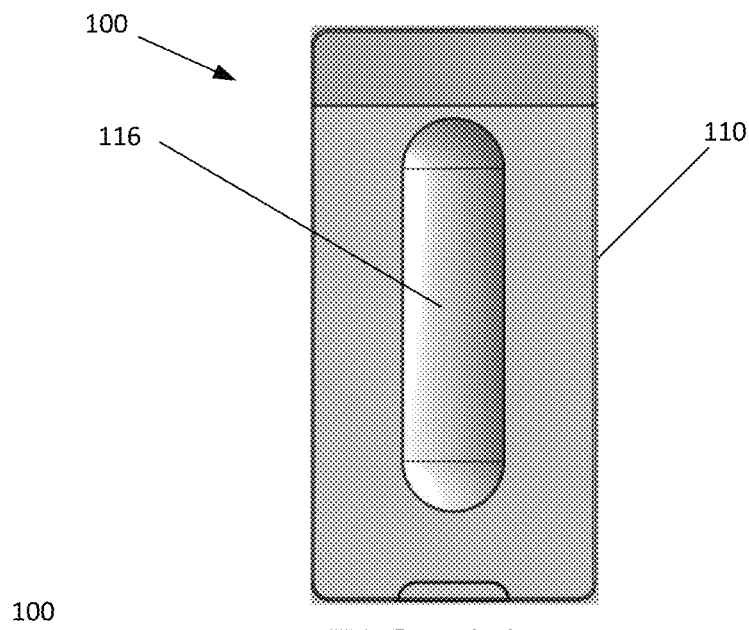
FIG. 1A and FIG. 1B illustrate an example device controller, according to one or more examples described herein.

In examples, a device controller detects user inputs in a first location, and then communicates an instruction based on the user input to a second device through one or more wireless intermediary devices. The wireless intermediary devices can be used to extend a wireless range of the control device. Specifically, each home device controller can directly operate a local network of smart home devices through wireless commands based on gesture inputs performed on a sensory panel of the controller. A smart home environment can include multiple device controllers each operable to control a local network of smart home devices (e.g., lights, audio systems, appliances, television sets, etc.). According to examples described herein, unique gesture inputs on a device controller may cause the controller to establish a mesh bridge through an intermediary device (e.g., a wireless hub, smartphone, another device controller, etc.) to transmit control commands to a recipient device controller having its own local network of smart home devices. The gesture inputs performed on one sending controller can cause the smart home devices in the recipient controller's local network to create a scene (e.g., in a different room than the sending controller's location), as described herein.

In various embodiments, a device controller includes an exterior panel and a sensing module. In certain examples, the sensing module detects and interprets the touch input of the user as one of multiple possible inputs that ultimately control one or more home devices or create a scene in a particular area (e.g., a room in a house).

In various examples, the device controller operates to interpret any one of multiple possible touch inputs of a user, and implement a set of operations that are pre-associated with the interpreted touch input. For example, the multiple possible touch inputs can correspond to gestures, such as tap actions (e.g., single, double, triple, or more taps), one or more long touches, slides (e.g., continuous touching motion of user in any direction). Still further, gestures can include more complex motions, such as multi-directional inputs, or patterned inputs (e.g., long touch followed by short tap).

In some examples, the device controller can comprise an intelligent light switch that includes functionality for switching and dimming lights of a dwelling. In such examples, the device controller can select and implement a scene that corresponds to a detected input action of the user. The home device controller can be wirelessly connected to one or more smart home devices or systems (e.g., a smart light, temperature control system, audio or entertainment system, etc.). In certain implementations, the home device controller can be wired to a home device (e.g., a light) using existing home wiring (e.g., light switch wiring) of a household. A user can interact with the home device controller via touch gesture input to remotely operate a local network of home devices connected to the home device controller.

In certain examples, the user can implement a scene for a portion of a dwelling (e.g., bedroom, kitchen, living room, etc.), where the scene identifies preset settings for one or multiple devices in the portion of the dwelling. In various examples, multiple control devices can be used to implement different scenes in different portions (e.g., rooms) of the dwelling. For example, the user can input a double tap on the external panel of the device controller in a first room to implement a first scene for that room, and input a double tap (or other gesture) on the same device controller to implement another scene in another room.

In at least some examples, the device controller includes at least one groove formed on the exterior panel to receive at least a first type of input (e.g., a slide input to dim a connected light). Additionally, the touch-sensitive panel includes one or more surrounding regions that are capable of receiving at least a second type of input. In response to receiving a touch input from a user, the device controller performs an output function to control one or more connected devices, wirelessly or wired, based on the interpreted touch input.

Described herein are examples of "home device controllers," "smart device controllers" or simply "device controllers," which may be used interchangeably throughout. Such "home devices" are not limited to controllable or smart home devices within a household, but may be any remotely operable smart device in any setting (e.g., outdoors, in a business environment, etc.). Thus, the term "home" is termed in relation to any system environment where the distributed system of home device controllers is installed, and can include households, office spaces, other indoor spaces of businesses or other entities, outdoor spaces, and the like. For example, a smart device described herein as a home device can comprise a remotely operable sprinkler system, computing device, television or entertainment system, sprinkler system, kitchen devices (e.g., a stove, oven, refrigerator, coffeemaker, tea kettle, toaster, etc.), security system, garage door, gate, mailbox, doors, window shade actuators, fans, etc. A home device can also comprise a device wired to the home device controller (e.g., via standard light wiring) and traditionally operable by an analog light switch or dimmer switch. Such wired devices can include lights, fans, etc.

Techniques described herein comprise the use of device controllers each operating a local network of home devices (e.g., smart home devices) for implementing scenes using the local network of smart devices (e.g., connected and load devices) based on configured associations between unique gesture inputs and the scenes themselves. In certain examples described herein, a scene may be implemented in any part of a dwelling from the unique gesture input being performed on any other device controller within the dwelling (e.g., via one or more intermediary devices).

As used herein, a device controller can comprise a computing device and can provide network connectivity and processing resources for communicating with a local network of home devices and a distributed system of device controllers over one or more networks. The device controller can also comprise custom hardware, and in certain examples, can also operate a designated application configured to communicate with the network of home device controllers.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. Memory, processing, and network resources may all be used in connection with the establishment, use, or performance of any example described herein, including with the performance of any method or with the implementation of any system.

Furthermore, one or more examples described herein may be implemented through the use of instructions that are executable by one or more processors. These instructions may be carried on a non-transitory computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of non-transitory computer-readable mediums include permanent memory storage devices, such as hard drives on computing devices, such as the home device controllers described herein. Other examples of computer storage mediums include portable storage units, such as flash drives or flash memory (such as those included in smartphones, multifunctional devices or tablet computers). Computers, terminals, network-enabled devices (e.g., mobile devices or home device controllers described herein) are all examples of machines and devices that utilize processors, memory, and instructions that may be stored on computer-readable mediums. Additionally, examples may be implemented in the form of computer-programs, or a computer usable carrier medium capable of carrying such a program.

Example Device Controller

Figure 1B:
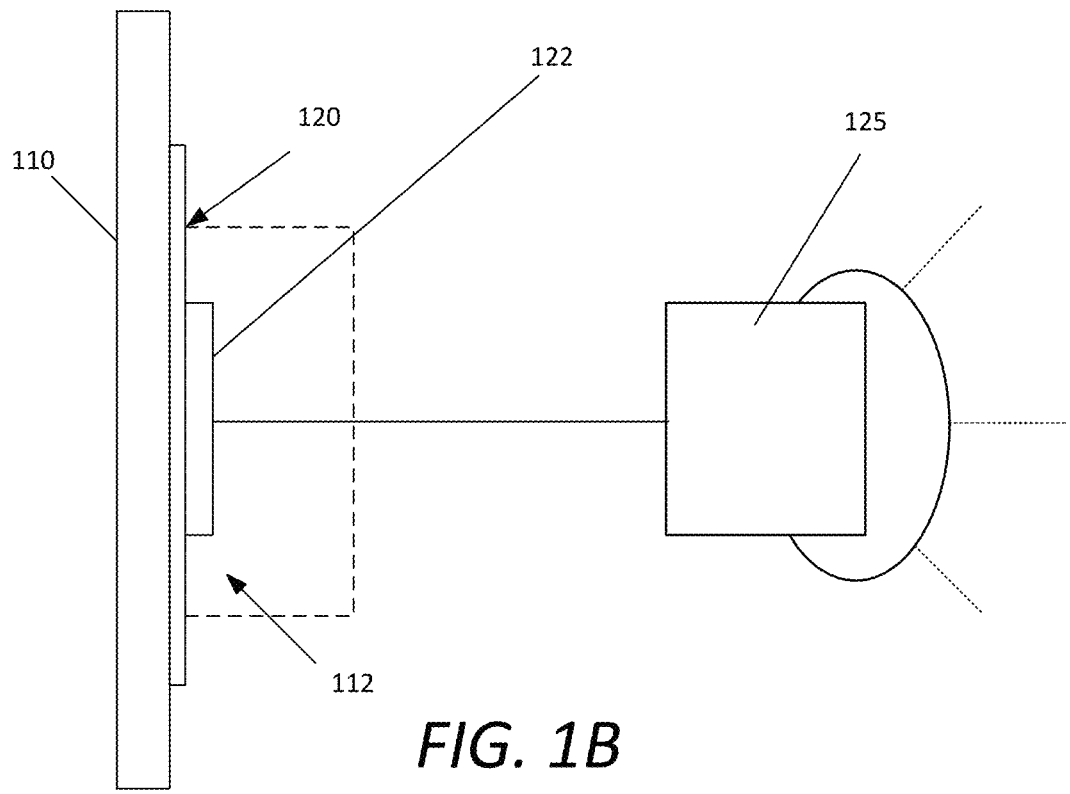

FIG. 1A and FIG. 1B illustrate an example device controller, according to one or more examples described herein. As described with some examples, the device controller 100 can be wall-mounted or otherwise provided in a dwelling or room to control operational aspects of a set of controlled devices 125, based on touch input of the user. In examples, the device controller 100 detects multiple types of inputs, including gesture input, at multiple regions of the exterior panel 110. In turn, the device controller 100 can control operational aspects of the controlled devices 125 based on the type of input and/or the location of the input. Additionally, the device controller 100 can automatically implement one or multiple scenes based on the type of touch input and/or the location of the touch input. For example, individual scenes can be associated with particular gestures (or touch input types) and/or regions where the touch input is received. When the device controller 100 detects a particular input type and/or location which is associated with a specific scene, the device controller 100 performs operations that cause each device associated with the specific scene to operate in accordance with a predefined operational aspect.

In examples, the exterior panel 110 overlays touch sensors (e.g., a layer of capacitive sensors), such that touch input can be detected and interpreted at various locations over a substantial portion of the exterior panel 110. Sill further, the device controller 100 can be structured to detect touch input which is received at any location of the exterior panel 110.

In some examples as shown, the exterior panel 110 includes a touch groove 116 which designates a region where a user can provide a particular type of touch input. In variations, the exterior panel 110 includes multiple input grooves that designate areas where touch input can be received. In other variations, other forms of three-dimensional touch input features can be used in place of or in addition to the touch groove 116. In such examples, the device controller 100 can receive additional types of touch input on regions of the exterior panel 110 which surround the touch groove 116 and/or other three-dimensional features.

According to examples, the device controller 100 includes a housing structure 104 having an exterior panel 110 and a base assembly 112 that includes a control module 120. The device controller 100 can be wall-mounted, with the base assembly 112 being provided within, for example, a wall receptable or recess, and the exterior panel 110 forming a thickness over the corresponding wall. In such examples, the base assembly 112 can further include an electrical interface 122 to electrically connect the device controller 100 to a power supply line of a dwelling. The electrical interface 122 can include wiring and switching elements to enable control module 120 to generate a switching output that controls the configuration of the switching elements of the electrical interface 122.

As described with some examples, the controlled devices 125 can include load devices and connected devices. Load devices refer to devices which have power supply lines (sometimes referred to as "load lines") that are controllable by the control device. Controlled devices refer to devices that have wireless or wireline communication interfaces that can receive commands from the device controller 100. Still further, controlled devices can include devices that can be controlled through power supply switching and commands. For example, many conventional-type load devices include wireless receivers (e.g., WiFi-enabled lighting devices), and some types of devices can receive communications through a powerline communication medium. In examples, the device controller 100 can implement a predetermined setting (or settings) that corresponds to an operational aspect of a controlled device using switching configurations on power supply lines of load devices and/or commands signaled through wireless or wireline mediums of connected devices.

The device controller 100 can control the operational aspect of a load device by controlling a power supply to the respective device. For example, the controlled device(s) 125 can include a set of load devices (e.g., light switch, ceiling fan, thermostat, etc.) which connect directly to a power line of a dwelling. In such cases, the device controller 100 can be wall-mounted to function as a switch (e.g., light switch) that controls the power supply to such devices. Through control of the power supply, the device controller 100 can control operational aspects of load devices, such as whether the load devices are on or off and/or the operational level of the load devices (e.g., dim level of lights, fan speed of ceiling fan, etc.). To implement a scene using such types of controlled devices 125, the device controller 100 can implement one or more switching type operations to control operational aspects such as on/off and power levels (e.g., dimmed lights, ceiling fan speed, etc.) of the controlled devices 125. The device controller 100 can implement the switching operations or configurations via, for example, switching elements of the electrical interface 122.

As an addition or variation, the device controller 100 controls the operational aspect of one or more controlled devices 125 by performing operations that include signaling one or more commands to the controlled device(s) 125, where the commands cause the controlled device to implement a particular operational aspect. In some examples, the control device includes a wireless transceiver that can wirelessly signal commands to the controlled device 125, either directly or indirectly through an intermediate device. As an addition or variation, the device controller 100 can signal commands to the controlled device using a wireline connection.

In some examples, the device controller 100 can have a primary function of operating as a light switch to control a set of load devices, including lights, ceiling fan and power outlets. As described with some examples, the device controller 100 can also control one or more connected devices (e.g., appliance, security camera, a security system, a door lock, a television, an audio (or media) system, or other types of devices) via, for example, a wireless interface.

The exterior panel 110 can include multiple input regions where touch input can be detected and interpreted. In some examples, the input regions of the exterior panel 110 include touch groove 116, and one or more regions that surround the touch groove 116. The touch groove 116 can be structured as an elongated (e.g., vertically elongated) indentation within the exterior panel 110, and the surrounding region(s) of the touch panel can be flat or substantially two-dimensional. In such examples, the device controller 100 can receive touch input within or on the touch groove 116 (e.g., swipe in direction of groove), as well as on the surrounding regions to the touch groove 116. The device controller 100 can further map or otherwise interpret touch input differently, depending on whether the particular region where the input is received. For example, a touch input received within the touch groove 116 can be interpreted as a first command, while a touch input received on the surrounding regions of the exterior panel 110 can be interpreted as a second command.

Still further, in some examples, the device controller 100 can detect and interpret touch input received at any location of the exterior panel 110. Thus, for example, a touch input can be received or extended on or near a corner or perimeter region of the exterior panel 110. The device controller 100 can respond by implementing an output operation that controls an operational aspect of a device or set of devices. Still further, the device controller 100 can implement a scene where operational aspects of one or multiple controlled devices 125 are controlled, in accordance with predetermined settings (e.g., as defined by a scene) for the respective controlled devices.

With respect to examples as described, the device controller 100 can determine characteristics of a touch input from which the device controller 100 can detect and interpret input. Further, the device controller 100 can map or otherwise interpret a detected gesture as a specific input. In response, the device controller 100 can implement an operation one or more operations (e.g., switching functions, command transmissions) to control operational aspects of one or more controlled devices 125. By way of example, the device controller 100 can control operational aspects of a set of controlled devices 125 in a dwelling (e.g., room in house), where the set of controlled devices 125 can include one or more devices selected from, for example, a group that includes a lighting device, a ceiling fan, a thermostat, an appliance, a security camera, a security system, a door lock, a television, an audio (or media) system, or other types of devices.

In certain implementations, the device controller 100 can be implemented as a wall-mounted control device that interprets touch inputs from users, and further interprets detected touch inputs to control operational aspects of a set of controlled devices 125. As an addition or variation, the device controller 100 detects touch input as gestures, and further control operation aspects of multiple controlled devices 125 at one time based on the detected gestures. Still further, as described with some examples, the device controller 100 implements a scene in response to detecting corresponding touch inputs on the exterior panel 110. For device controller 100, each scene can represent (i) a selection of one or more devices of a set of controlled devices 125, and (ii) an operational setting of each controlled device 125 of the selection. The device controller 100 can associate a gesture with a scene, such that when the device controller 100 detects the user providing a touch input that is detected as the gesture, the device controller 100 automatically implements the scene. By implementing the scene, the device controller 100 performs operations which result in implementation of the operational aspect of each controlled device 125, such that each controlled device operates at a particular setting or set of settings. The device controller 100 can implement the operational aspect by, for example, controlling a power supply for the controlled device 125 (e.g., lights) and/or by sending one or more commands to individual devices of the selection, to cause each of the respective devices to operate with the predetermined operational setting.

By way of illustration, the device controller 100 interprets (i) a first user gesture (e.g., a lateral swipe gesture) as on/off input, and the device controller 100 responds to the input by causing a first controlled device (e.g., light) to switch on or off; and (ii) a second gesture (e.g., a slide or touch and drag gesture on touch groove 116), as a range value setting command (e.g., dimming) for the first controlled device or for one or more second controlled devices. By way of example, gesture input can be used for on/off and/or dimming control on a set of connected lights of a dwelling.

Still further, the device controller 100 can interpret one or more touch inputs as being associated with a user specified setting of one or more controlled devices 125 (e.g., an audio device, an entertainment system, etc.). The device controller 100 can implement a setting, or set of settings, based on predetermined values specified by a scene.

In certain examples, the control module 120 includes an interface 122 to electrical and switching elements that power and control one or more of the controlled devices 125. When mounted, the interface 122 can be electrically connected to the electrical and switching elements, which can be housed within an electrical box or gang box (e.g., replacing an existing light switch and utilizing the existing line and load wiring). Accordingly, the exterior panel 110 can be mounted to be flush or nearly flush with an underlying wall, while the control module 120 and interface 122 can be housed within the electrical box.

In certain implementations, the control module 120 includes a circuit board that includes touch-sensitive sensors that generate reactive signals in response to touch inputs performed on the exterior panel 110. The device controller 100 can also include wireless communication resources to enable wireless communications with other devices. In some examples, the circuit board of the control module 120 can include one or more wireless transceivers and associated logic to enable the control module 120 to receive instructions and data from a user's mobile device, wireless hub, base station controller, and/or other device controllers. In such examples, the wireless transceiver enables the device controller 100 to communicate with one or more devices in a local network of the device controller using Bluetooth, Wi-Fi, cellular, or other wireless communication protocol. A user can, for example, operate a mobile device to specify which particular devices of the dwelling are to be controlled by the device controller 100, and can further customize gestures that can be interpreted to control multiple smart devices with a single gesture input, as described below.

Additionally, once the device controller 100 is installed and configured to control a group of devices in its local network of devices (e.g., located in the same room as the device controller 100), the user can operate an application on a mobile computing device to configure the device controller 100, using, for example, a Bluetooth or Wi-Fi connection formed via the wireless transceiver. In some examples, a user can use an application running on a mobile device to wirelessly access and configure the device controller 100. Among other configurations, the device controller 100 can be configured to associate one or more gestures with one or more scenes, where each scene specifies a set of settings or operational aspects for one or more controlled devices. For a given device controller 100, a user can operate an application to associate a gesture with a scene, where the scene is defined by a set of controlled devices 125 (e.g., lights, audio system, smart home devices, etc.) that the device controller 100 can communicate with and/or control, to cause the controlled devices 125 to implement one or more scenes (e.g., a dim setting for the lights, switching devices on or off, setting a device to a particular channel, a volume setting for a device, etc.). In various examples, the control operations and settings can be specific to each controlled device that is used to implement a scene. For example, in a given scene, the control operations for an entertainment system can include turning the entertainment system on, adjusting its volume, and tuning the entertainment system to a particular channel. In further examples, the same scene can include light settings, such as a specific dim level to create a desired ambiance, and even settings for certain smart home appliances (e.g., turning on a coffee maker, an automatic pet feeder, drawing automatic window shades, and the like.

According to example provided herein, the user can install multiple device controllers 100 in multiple rooms or portions of a dwelling (e.g., a home, a place of business, an outdoor patio and/or backyard, etc.), and further configure each device controller 100 to implement a particular scene that is specific to a dedicated room or portion of the dwelling. In this manner, each device controller 100 can directly operate a local network of controlled devices 125 (e.g., smart devices).

In one implementation, the device controller 100 can detect touch inputs on any region of the exterior panel 110. When the touch input is detected as a gesture having a pre-associated scene, the device controller 100 executes a series of control operations to implement the configured settings on its local network of smart devices. The control module 120 includes sensor logic to interpret the reactive signals generated from the gesture inputs performed on the exterior panel 110, including logic to identify locations on the panel 110 where the gesture input occurred, and interpret the gesture inputs to implement a scene through control commands to a specified set of controlled devices (e.g., connected smart devices).

In certain examples, the control module 120 can include logic to accurately interpret instances when the user's touch input is a tap, slide, or other type of touch input. In such examples, the control module 120 can interpret a gesture based on one or more characteristics of the touch-input, including characteristics corresponding to an amount of movement which occurred when the user contacted the panel 110, a path of the movement, a duration in time of the contact, a location on the exterior panel 110 where the touch input is detected, initiated, and/or completed, and/or whether another touch was detected on the external panel 110 within a following time interval of a prior touch or contact with the exterior panel 110 (e.g., a double tap, slide and tap, etc.).

Distributed Device Controller System

Figure 2:
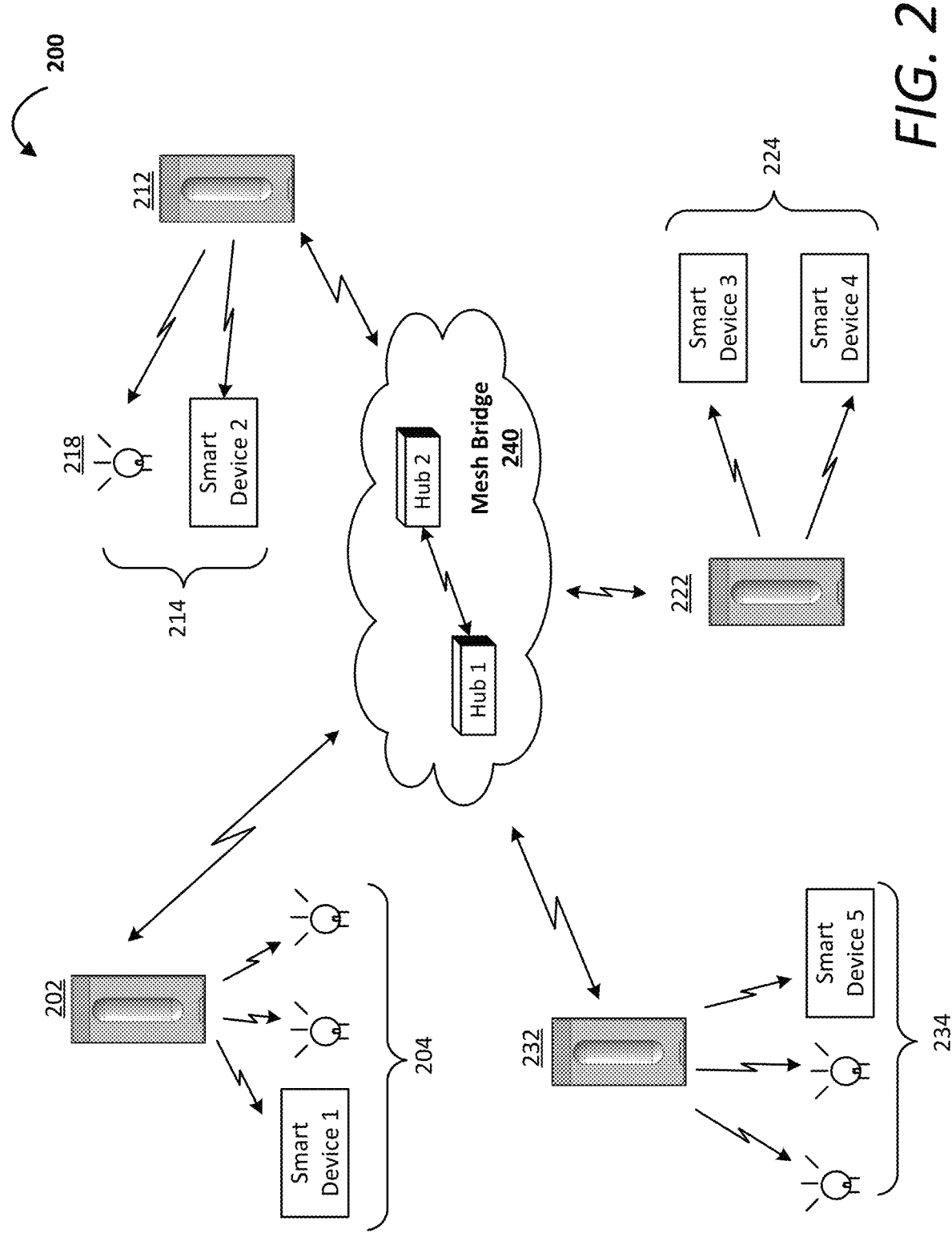
FIG. 2 illustrates an example of a distributed system of device controllers operable to control any number of smart devices, according to various embodiments.

FIG. 2 illustrates an example of a distributed system of device controllers operable to control any number of controlled devices, according to various embodiments. Each device controller 202, 212, 222, 232, shown in FIG. 2 can comprise an example of a device controller 100 as shown and described with respect to FIGS. 1A and 1B. Referring to FIG. 2, the distributed system 200 can be installed in a smart home environment (e.g., including places of business, outdoor areas, commercial spaces, and the like) and can include any number of device controllers 202, 212, 222, 232 each having a local network of any number of controlled devices 204, 214, 224, 234. A user may interact with any individual device controller (e.g., home device controller 202) to operate any controlled device within the local network 204 of that device controller 202, including any controlled device in the local networks 214, 224, 234 of the remaining device controller 212, 222, 232 in the distributed system 200 via a mesh bridge 240 that connects each of the home device controllers 202, 212, 222, 232 with each other.

In various examples, the system 200 can provide a recording function through connection with any of the home device controllers 202, 212, 222, 232 that enables the user to implement a scene. In some examples, a user selection of the recording function (e.g., through a user interface of a designated application executing on the user's mobile device) can cause the system 200 to record scenes and associated gestures that cause each scene to be implemented. The user may, for example, set a temperature, a fan speed, a lighting dim level, a digital photo arrangement (e.g., on a television or digital picture frame system), an audio player, and the like to create a particular scene.

According to implementations provided herein, the user can further configure a scene—via a gesture input with one device controller—in a different device controller's local network. As an example, device controller 232 may be installed in a garage and have a local network of controlled devices 234 comprising a pair of lights and smart device 5 (e.g., a garage door opener). In certain implementations, the user can configure a gesture input for device controller 232 that creates a scene using controlled devices of one or more other local networks 204, 214, 224 of the other device controllers 202, 212, 222. Specifically, using a designation application on the user's computing device, the user can link with device controller 232, configure a unique gesture input (e.g., an "S" input with a tap) that causes device controller 232 to generate a set of control commands to be transmitted via a mesh bridge 240 and received by a receiving device controller (e.g., device controller 222 in the living room).

In various examples, the mesh bridge 240 can be facilitated by any type of wireless communication device or multiple wireless communication devices, such as wireless hubs (as shown), personal computers, mobile computing devices, wireless repeaters, other device controllers, and the like. Continuing with the example of FIG. 2, the user can perform the unique gesture on device controller 232, which can cause the controller 232 to generate and transmit a set of control commands to one or more destination device controllers to implement the configured scene(s). In some aspects, the transmission of the control commands can involve one or more hops through the mesh bridge 240 before being received at the receiving controller. Furthering the example, when the user arrives at home, the unique gesture performed on device controller 232 in the garage can implement a scene in the living room of the home, which can include, for example, any number of smart devices 224 directly operated by device controller 222. The unique gesture performed on controller 232 in the garage can cause the controller 232 to determine the destination controller 222, establish a wireless link with the destination controller 222 via the mesh bridge 240, generate a set of commands that enable the destination controller 222 to implement the scene associated with the unique gesture, and transmit the commands to the destination controller 222 via the mesh bridge 240 for implementation. Upon receiving the commands from the originating controller 232, the destination controller 222 can generate a set of control commands and transmit them to the respective smart devices in its local network 224 to implement the scene.

In one example, the user may have a routine in which upon arriving at home, the user listens to a particular radio station on an audio system at a desired volume level, has the lights in the living room at a particular dim setting, has the window shades closed, and has the living room at a particular temperature setting. The user can configure this routine as a scene (e.g., an evening scene) with an associated unique gesture that may be performed on the device controller 222 directly connected to the various home devices needed for the scene, and/or a different device controller in which the control commands implement the scene are transmitted via the mesh bridge 240. It is contemplated that the unique gesture may be device controller specific—meaning that the unique gesture may only by performed on one device controller (e.g., 232) to implement the scene in a different area of the dwelling—or can be generally performed on any device controller 202, 212, 222, 232 to execute the scene. In still further examples, a unique gesture may be configured by the user that creates multiple scenes within the smart home environment. Accordingly, the user can associate a particular gesture on a device controller that can cause a set of control commands to be transmitted via the mesh bridge 240 to multiple other device controllers to implement scenes in multiple portions of the dwelling.

Scene Implementation

FIG. 3A illustrates implementation of a scene by a device controller 302, according to various aspects described herein. As described herein, the device controller 302 can be mounted to a wall of a smart home environment 300, and can control a local network of controlled devices. In an example shown, the controlled devices include lighting elements 312, a fan 314, a television 304, an audio system 306, a temperature control system 308, a door locking system 324, automatic window shades, smart home appliances, and any number of other load or connected devices described with various examples.

In the example shown, a user 310 can enter a particular room or portion of a dwelling and perform a gesture on the device controller 302 that comprises a scene trigger, which can be detected by the device controller 302 and communicated to relevant smart home devices to implement a corresponding scene. When the device controller 302 receives the gesture, it can implement a scene corresponding to the gesture by generating and transmitting control commands to the various smart home devices needed to automatically implement the scene. For example, the scene can comprise a combination of dim levels for lighting elements 312, displayed content on the television 304, a music channel or file content to be played on the audio device 306, a certain temperature setting on the temperature control system 308, activation of the fan 314 at a certain setting, and/or the door locking mechanism 324 to be activated or deactivated. Based on the various settings of the scene, the device controller 302 can generate control commands, and transmit them to the relevant smart home devices to implement the scene. It is contemplated that any number of scenes implemented through operation of the controlled devices can be configured by the user using the device controller 302, as described in further detail below.

According to aspects of the device controller 302 described herein, the user 310 can also input a unique gesture on the device controller 302 that can cause a scene to be implemented in another portion of the dwelling that is controlled by a different device controller. In doing so, the device controller 302 can interpret the unique gesture and execute connection instructions to create a mesh bridge to the destination device controller (e.g., via one or more intermediary devices 317). Upon receiving the unique gesture, the device controller 302 can transmit commands for the scene to the intermediary device with, for example, a destination addresser identifier of the recipient device controller. Upon receiving the commands, the recipient controller can implement the scene accordingly.

As provided herein, an intermediary device 317 can comprise a wireless hub, a smartphone, personal computer, etc. In one example, the device controller 302 transmits the scene commands to a first intermediary device 317 via a first wireless protocol (e.g., a Bluetooth connection). If multiple intermediary devices 317 are needed, it is contemplated that they can communicate the scene commands using a different protocol (e.g., Wi-Fi for increased range). At the destination device controller ("to 2nd controller" as shown in FIG. 3A), a final intermediary device 317 can transmit the scene commands to the destination device controller using the first wireless protocol.

FIG. 3B illustrates an example gesture performed by a user on a device controller to implement a scene for a local network of smart devices operated by a second device controller, according to various examples. In the example of FIG. 3B, the user 328 can perform a unique gesture 327 on the device controller 322 to implement a scene in a different portion of a dwelling using any number of settings for any number of controlled devices, such as those shown in FIG. 3A. As an example, the user 328 has performed an "S" gesture with a following tap below the gesture. The user 328 may have previously configured this unique gesture to be associated with a smart home scene in different room of the smart home environment 300. As an example, the user 328 can perform the unique gesture from a bedroom device controller 322, which can cause a scene to be generated in the kitchen of the user's home, using controlled devices located in or near the kitchen. Furthering the example, the gesture 327 can cause the kitchen lights to turn on at a configured dim level and any number of other connected devices to activate (e.g., a coffee maker to begin brewing coffee).

As such, the user 328 can enter the smart home environment 300 and perform the unique gesture 327 on the device controller 322, which will cause an associated scene to be implemented in a different local network accordingly. As another example, the gesture 327 can be performed on any device controller within a household, which can cause a destination controller to automatically turn the lights 312 on to a specific dim level, turn the television 304 on to a specific channel with a specific volume level, turn on the audio system 306 (e.g., which can play audio from the television content), tune the audio system 306 to a specific volume, and set the temperature control system 308 to a specified temperature (e.g., seventy-two degrees Fahrenheit).

Mesh Bridging

Figure 4:
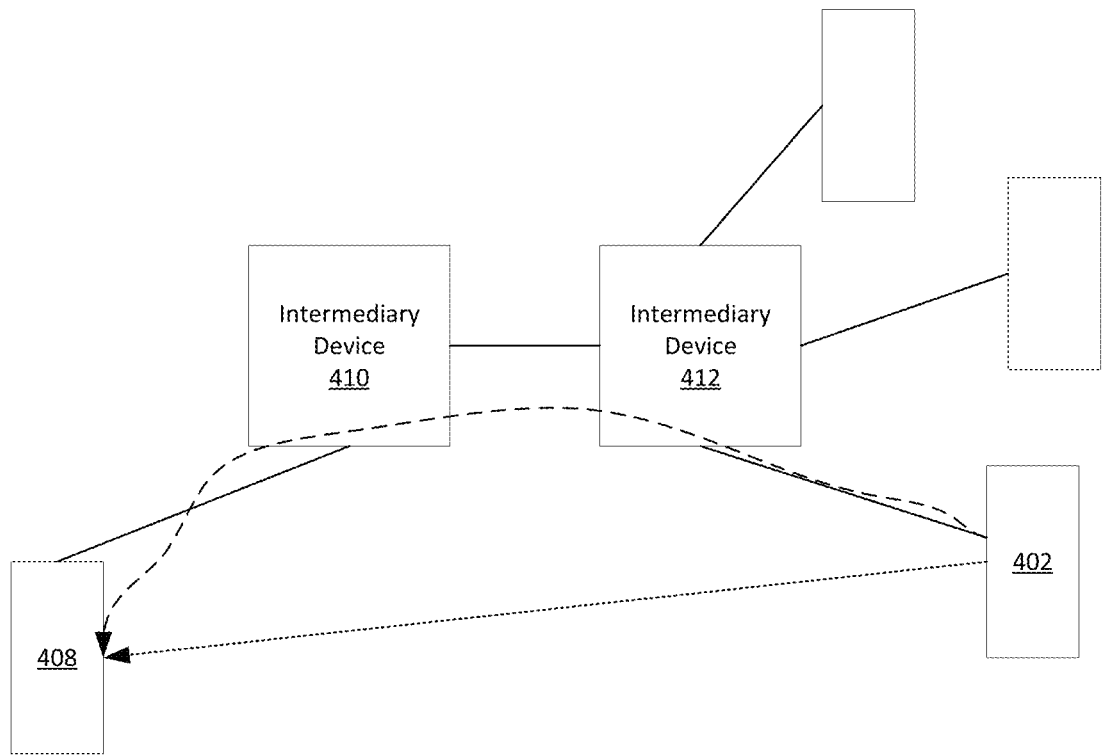
FIG. 4 illustrates an example of a control device executing a mesh bridge to communicate a set of control commands to implement a scene in a local network or another device controller.

FIG. 4 illustrates an example of a control device executing a mesh bridge to communicate a set of control commands to implement a scene in a local network or another device. In various examples, a device controller 402 can be used to implement control operations based on a detected user input. With reference to an example of FIG. 4, the device controller 402 (e.g., such as described with an example of FIG. 1A and FIG. 1B) may detect an input from a user (e.g., touch input). The device controller 402 can determine one or more control operations from the input. The control operations may include controlling one of (i) a target device 408 that is out of range of the first device 402 (e.g., Bluetooth range), and/or (ii) a device controller for the target device 408. To illustrate with the latter case, the target device 408 can correspond to a load device which connects to a load line, and the device controller for the target device 408 can control the load on the load line used by the target device 408. The first device 402 may communicate the instruction to an intermediary device 412, which in turn may communicate the instruction to another intermediary device 410 (or to the target device 408). The intermediary device(s) 412, 410 may use an alternative wireless communication medium having longer range (e.g., Wi-Fi).

In this way, the device controller 402 can implement control operations to, for example, implement a scene in multiple portions of a dwelling. For example, a user may enter the house in one area, touch a device controller 402 for a desired scene, and the device controller 402 may communicate an instruction to implement the same scene, or a complimentary scene in another room that is outside of the wireless range of the device controller 402. The device controller 402 may use one or more intermediary devices to forward the communication.

Methodology

Figure 5A:
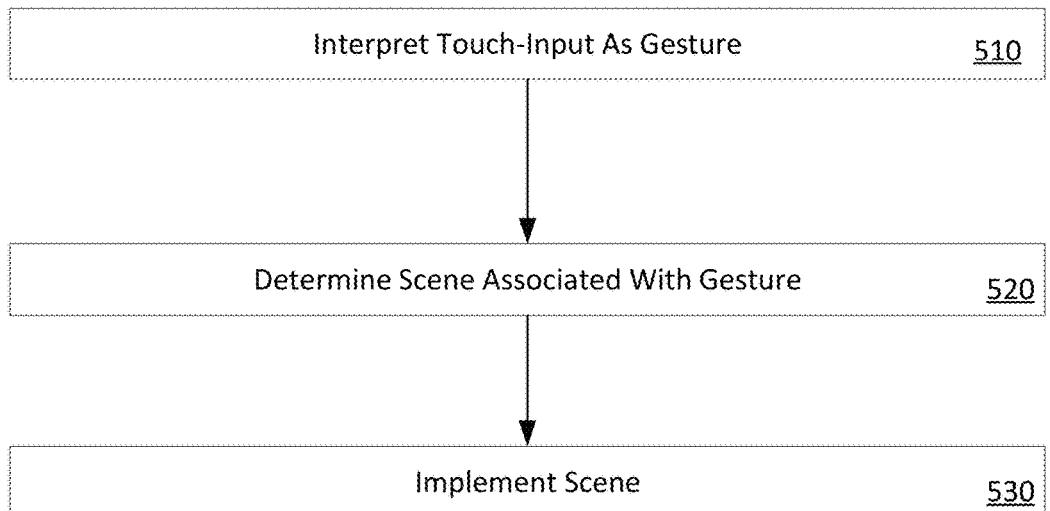
FIGS. 5A and 5B are flow charts describing example methods of implementing a scene using one or more device controllers, according to one or more examples.

FIG. 5A illustrates a method of operating device controller 100, according to one or more examples. In describing an example of FIG. 2A, reference may be made to elements of FIGS. 1A and 1B for purpose of illustration.

In various examples, the device controller 100 detects and interprets a touch input as a gesture (510). The device controller 100 determines a scene associated with the gesture (520), where the scene identifies one or more devices that are to be controlled to have a particular output (e.g., setting) in accordance with a scene. The device controller 100 uses one or more interfaces (e.g., interface 122 and/or a wireless transceiver) to implement control operations on the smart devices in accordance with the scene (530).

Figure 5B:
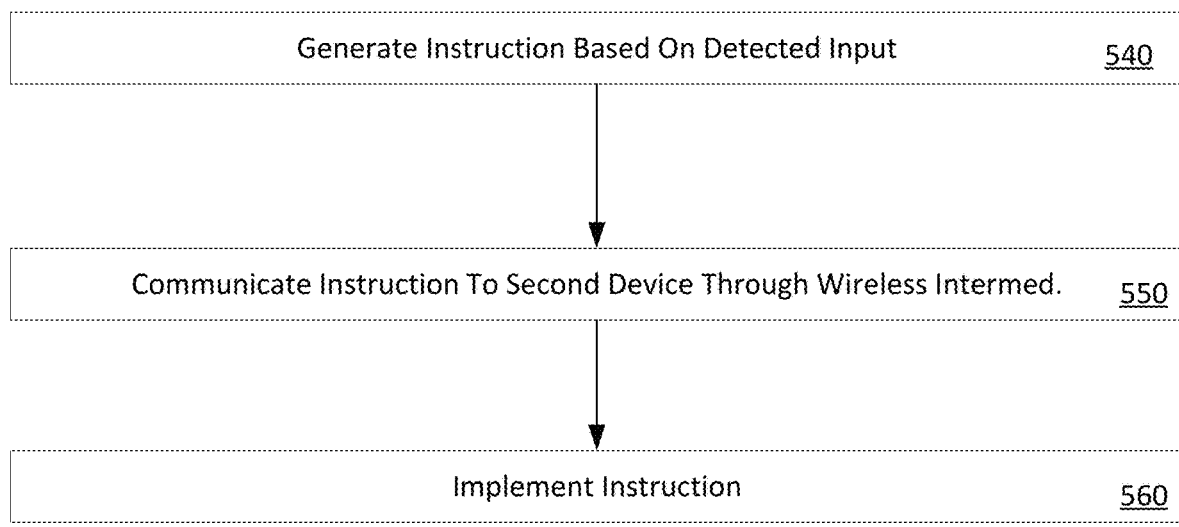

FIG. 5B illustrates a method for a device controller to implement control operations based on a detected user input. With reference to an example of FIG. 4, a device controller 402 (e.g., such as described with an example of FIG. 1A and FIG. 1B) may detect an input from a user (e.g., touch input). The control device 302 can determine one or more control operations from the input (540). The control operations may include controlling a target device 408 that is out of range of the first device 302 (e.g., Bluetooth range). The first device 402 may communicate the instruction to an intermediary device 412, which in turn may communicate the instruction to another intermediary device 410 (or to the target device 408). In some examples, the intermediary device(s) may use an alternative wireless communication medium having longer range (e.g., Wi-Fi) (550).

In this way, the device controller 402 can implement control operations to, for example, implement a scene in multiple rooms or segments of a house (560). For example, a user may enter the house in one area, touch a control device for a desired scene, and the control device 402 may communicate an instruction to implement the same scene, or a complimentary scene in another room that is outside of the wireless range of the control device 402. The control device 402 may use one or more intermediary devices to forward the communication.

Figure 6A:
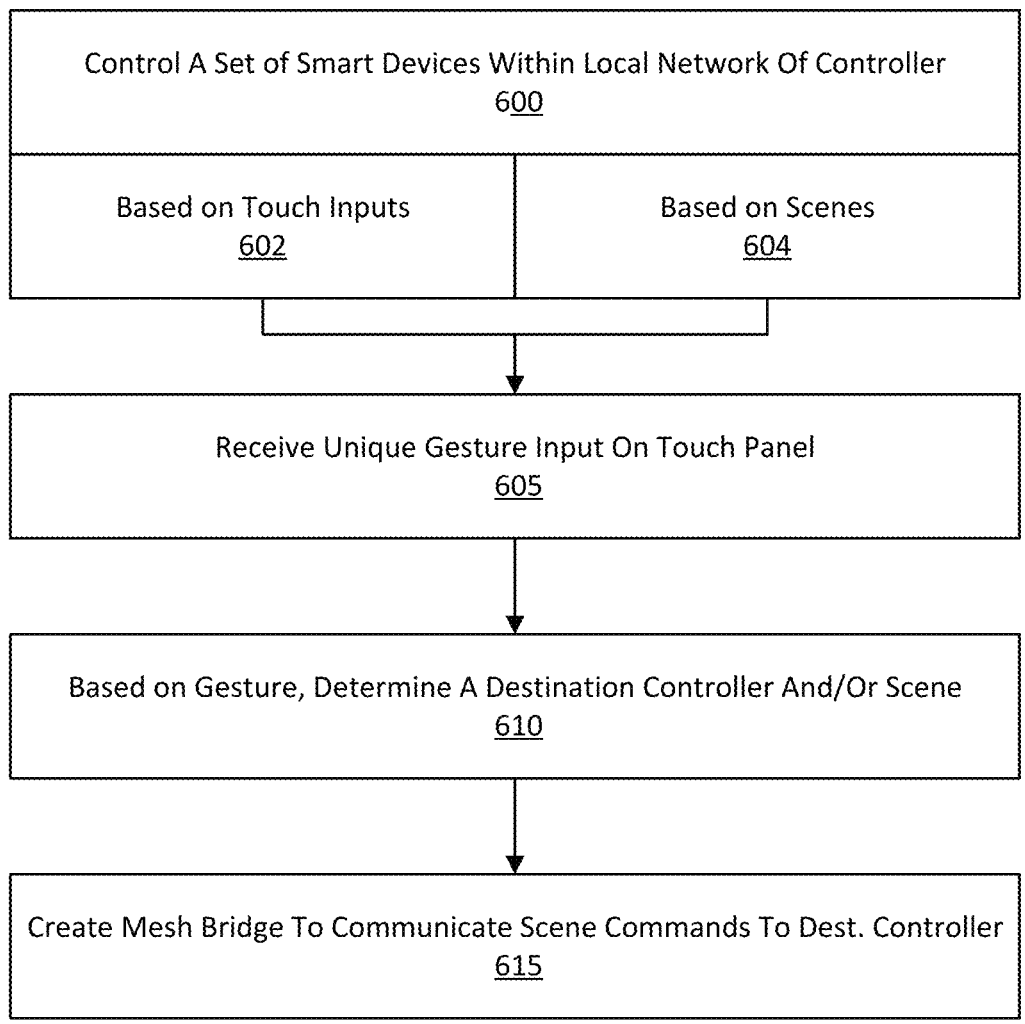
FIG. 6A is a flow chart describing an example method of implementing a scene via a mesh bridge, according to examples described herein.

FIG. 6A is a flow chart describing an example method of implementing a scene via a mesh bridge, according to examples described herein. In the below description of FIG. 6A, reference may be made to certain features shown and described with respect to other drawings, such as FIGS. 3A and 3B, for illustrative purposes. Referring to FIG. 6A, a device controller 302 can control a set of smart devices within a local network of the device controller 302 (600). In various implementations, the device controller 302 can receive touch inputs (e.g., taps or slide inputs) to perform basic commands for one or more light elements 312 (e.g., on/off commands and dimming commands) (602). Additionally, the device controller 302 receive gesture inputs from a user 310 (e.g., double taps, slide taps, touch and hold inputs, etc.) and implement an associated scene using the controlled devices (e.g., load devices, connected and other smart devices, etc.) in its local network, as described herein (604).

According to further examples, the device controller 302 can receive a unique gesture input 327 on the exterior, touch-sensitive panel (605). Based on the gesture, the device controller 302 can determine a destination controller and/or scene to be implemented by a destination controller using the local network of smart devices of that controller (610). In some aspects, the device controller 302 can further determine one or more intermediary devices 317 to transmit a set of scene commands to the destination controller. In doing so, the device controller 302 can create a mesh bridge to communicate the scene commands to the destination controller to implement the scene (615).

Figure 6B:
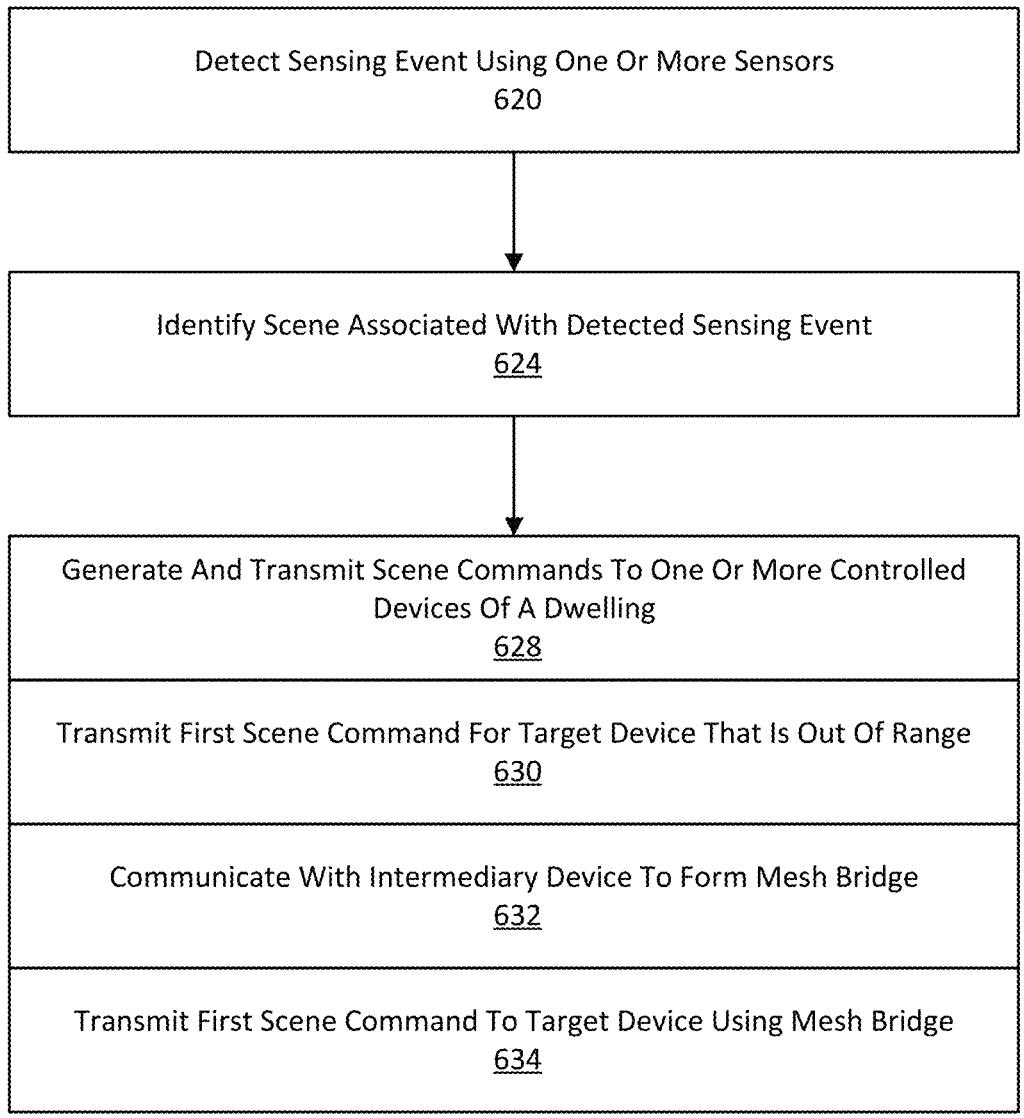
FIG. 6B illustrates an example method for operating a device controller to implement a scene in multiple segments of a dwelling, according to one or more embodiments.

FIG. 6B illustrates an example method for operating a device controller to implement a scene in multiple segments of a dwelling, according to one or more embodiments. In the below description of FIG. 6B, reference may be made to certain features shown and described with respect to other drawings, such as FIGS. 3A and 3B, for illustrative purposes.

In examples, device controller 302 detects a sensing event using one or more sensors (620). In one implementation, the device controller 302 uses touch sensors to detect and interpret a touch input. As an addition or variation, the device controller 302 uses a proximity or presence sensor to detect a sensor event which can reflect the presence of a person or other object. The device controller 302 can further include a local wireless transceiver that can communicate with devices of a local network (e.g., using WiFi or Bluetooth protocols). The device controller 302 can be associated with a given range that defines the reach of the wireless transceiver. For example, the device controller's transceiver may lack range to reach different floors and/or distance of a dwelling.

The device controller 302 can operate to identify a scene that is associated with the detected sensing event (624). As described with other examples, the scene can specify or otherwise define a setting or operational aspect of one or more controlled devices of a dwelling. The controlled device(s) can further include at least a target device that is outside of the given range of the wireless transceiver of the device controller 302.

The device controller 302 can further generate and transmit a set of scene commands to one or more controlled devices of the dwelling (628), where the scene commands cause the one or more controlled devices to implement a scene that is associated with the sensing event. In examples, the scene commands can select controlled devices that are identified by the associated scene of the detected sensing event. Further, the scene commands can specify values for settings of the specified controlled devices, where the setting values are specified or otherwise defined by the associated scene.

In transmitting the scene commands, the device controller 302 can transmit at least a first scene command for a target device that is outside of the given range of the wireless transceiver (630).

In some examples, the device controller 302 can communicate with a first intermediary device that is within the given range of the wireless transceiver to cause the first intermediary device to form a mesh bridge to the target device (632). The first intermediary device can, for example communicate with the device controller to determine an address or other identifier of the target device. In some examples, the first intermediary device corresponds to another device controller. In variations, the first intermediary device corresponds to a mobile computing device of a user.

The device controller 302 can transmit at least the first scene command to the target device using the mesh bridge (634). In some examples, the device controller 302 can transmit the first scene command simultaneously (or near simultaneously) with instructions that cause the first intermediary device to locate or otherwise identify the target device, and forward the first scene command to the target device. In variations, the first intermediary device converts or transforms the first scene command for the target device. The target device can receive the first scene command, and in response, the target device implements a setting or operational aspect of the associated scene.

In some variations, the device controller 302 communicates with the first intermediary device to cause the first intermediary device to communicate the first scene command to the target device using a second intermediary device. For example, the second intermediary device can be used when the target device is also outside of the range of the first intermediary device, but within reach of the second intermediary device (and the second intermediary device is outside the range of the device controller).

Still further, in some variations, the target device can correspond to a device controller for a load device where the setting or operational aspect is to be implemented. For example, the first intermediary device can forward the first scene command to a wall-mounted device controller that controls a power output on a load line of the dwelling. The wall-mounted device controller can then implement control operations that controls the power output of the load line, so as to cause the target device to implement, for example, a predetermined setting.

By way of example, the target device can correspond to a lighting device that is controlled by a wireless (or smart) light switch, and the scene may specify a power or dimming level for the lighting device. The device controller 302 can respond to a sensing event (e.g., user input) in one part of a dwelling (e.g., garage) by sending a first scene command to a switch controller in another portion of the dwelling (e.g., upstairs bedroom). In turn, the switch controller can adjust the power level on the load line used by the lighting device.

Hardware Diagram

Figure 7:
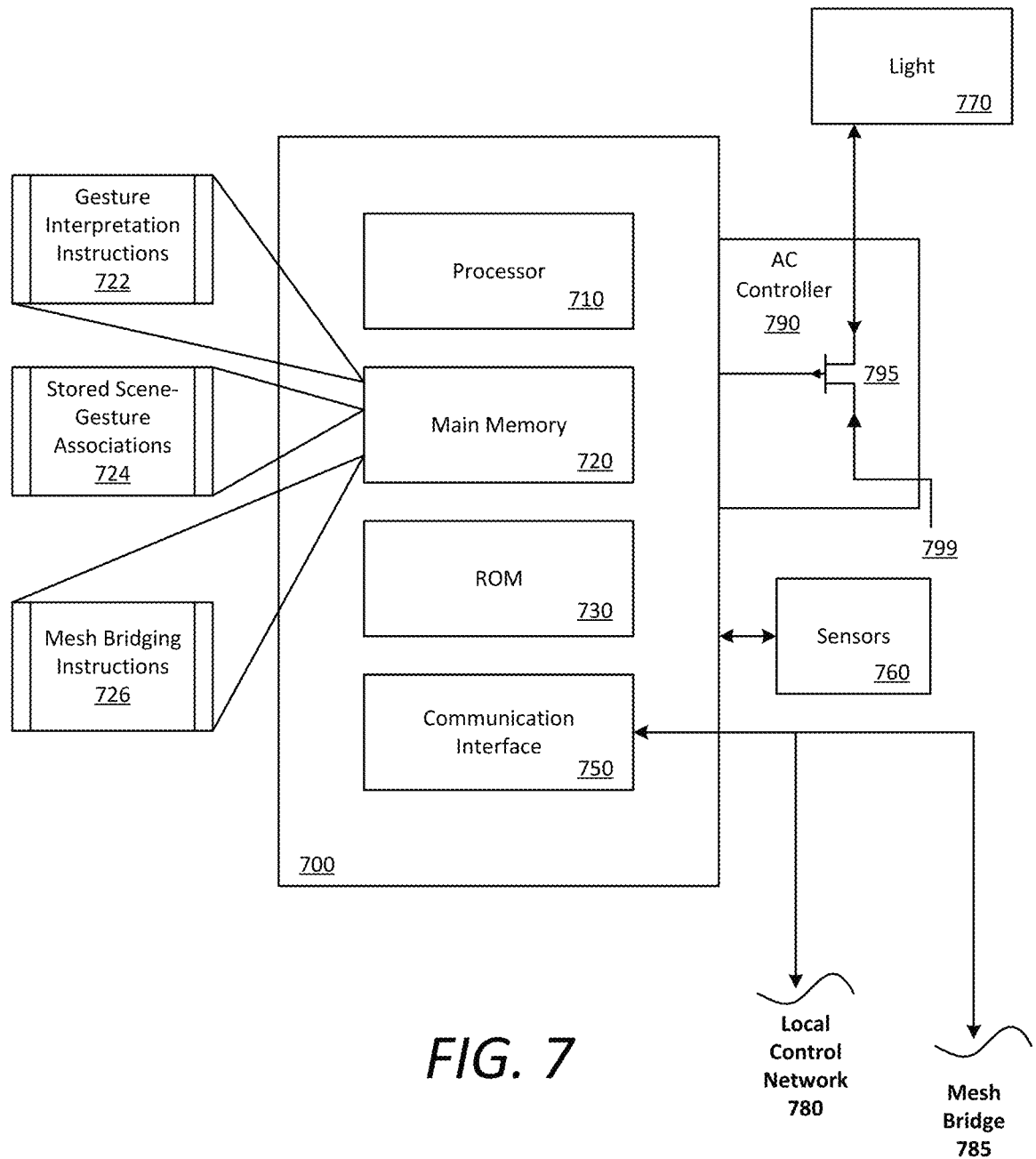
FIG. 7 is a hardware diagram illustrating a processing device upon which example control devices described herein may be implemented.

FIG. 7 is a hardware diagram illustrating a computing device 700 upon which example device controllers described herein may be implemented. In various examples, the computing system 700 can comprise the logic and processing performed via user interaction with the device controller 100 as shown and described with respect to FIGS. 1-6. In one implementation, the computing system 700, or device controller 700 (used interchangeably) includes processing resources 710, a main memory 720, a read-only memory (ROM) 730, and a communication interface 750. The computing system 700 includes at least one processor 710 for processing information stored in the main memory 720, such as provided by a random-access memory (RAM) or other dynamic storage device, for storing information and instructions which are executable by the processor 710.

As provided herein, a sensing module 120 of the device controller 100 can comprise the processor 710 or combination of the processor 710 and main memory 720 as shown and described with respect to FIG. 7. In various embodiments, the sensing module 120 may be a general-purpose microprocessor, a microcontroller, a combination of one or more microprocessors and/or microcontrollers acting in concert, and/or a touch sensor specific integrated circuit incorporating, or connected to, one or more of these processing configurations. The main memory 720 also may be used for storing temporary variables or other intermediate information during execution of instructions to be executed by the processor 710. The computing system 700 may also include the ROM 730 or other static storage device for storing static information and instructions for the processor 710.

The communication interface 750 enables the computing device 400 to communicate over one or more control networks 780 (e.g., Bluetooth, Zigbee, Wi-Fi, etc.) through use of one or more wireless network links. Using the network links, the computing system 700 can communicate with one or more smart home devices, one or more servers, or third-party intermediary communication module. The executable instructions in the memory 720 can include gesture interpretation instructions 722, which the computing system 700 can execute to determine gestures performed by users on the surface of the device controller 100 and generate control commands for the appropriate smart devices to create a particular scene. For example, the processor 710 can execute the gesture interpretation instructions 722 to receive signals from touch sensors 760 coupled to the surface of the device controller 100 (e.g., the exterior panel 110 and the touch groove 116) and generate control commands based on the detected gestures to implement an associated scene.

The executable instructions stored in memory 720 can also include stored scene-gesture associations 724, which the computing system 700 can reference upon receiving a particular touch sensor signature from the touch sensors 760. As described herein the computing system 700 may be connected via a wired connection to one or more home devices (e.g., light elements), or can implement wireless network protocols to connect with smart devices via the local control network 780 to transmit the control commands.

The executable instructions may also include mesh bridging instructions 726, which the processor 710 executes in response to detecting a unique gesture for a scene to be implemented by a second device controller (e.g., through operation of smart devices within the local control network of the second controller). In response to receiving the unique gesture, the mesh bridging instructions 726 can cause the processor 710 to establish a mesh bridge 785 through one or more intermediary devices to transmit a set of scene commands to the second, destination controller, as described throughout the present disclosure.

In some embodiments, the computing system 700 may be coupled to AC controller 790, for example by clips that provide for an electrical connection to be made between spring clips or pogo pins on one side (e.g., the device controller 700 or the AC controller 790) and electrically conductive pads on the corresponding side. AC controller 790 may include connections to wall wiring for line, load, neutral, and/or ground wires, and in some embodiments, may include L1 and L2 outputs for 3-way configurations. In some embodiments, AC controller 790 may include an AC microcontroller which receives instructions from the computing system 700, and which may control field effect transistors, triac(s), and/or other dimming mechanisms, for example as discussed above. In certain examples, the AC controller 790 can include a dimming FET 795 connecting the AC controller 790 to a line wire and load wire of existing wiring (e.g., of a light switch). In the example shown in FIG. 7, the load wire connects the AC controller 790 to the one or more wired home devices 770 (e.g., lights), and the line wire connects the AC controller 790 to a power source 799.

The processor 710 is configured with software and/or other logic to perform one or more processes, steps and other functions described with implementations, such as described with respect to FIGS. 1 through 4B elsewhere in the present application. Examples described herein are related to the use of the computing system 700 for implementing the techniques described herein. According to one example, those techniques are performed by the computing system 700 in response to the processor 710 executing one or more sequences of one or more instructions contained in the main memory 720. Such instructions may be read into the main memory 720 from another machine-readable medium. Execution of the sequences of instructions contained in the main memory 720 causes the processor 710 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude claiming rights to such combinations.

What is claimed is:

1. A device controller comprising:
a wireless transceiver; and
a control module comprising one or more processors and a memory storing instructions that, when executed by the one or more processors, cause the control module to:
determine a scene corresponding to a set of settings for one or more controlled devices; and transmit a set of scene commands to the one or more controlled devices to cause the one or more controlled devices to implement the scene;
wherein the one or more processors transmit, via the wireless transceiver, a first scene command of the set of scene commands to a first controlled device of the one or more controlled devices by:
communicating with an intermediary device to form a mesh bridge to the first controlled device, the intermediary device including a wireless hub and being in direct communication with its own local network of smart home devices that does not include the device controller; and
transmitting the first scene command to the first controlled device using the mesh bridge, the first scene command causing the first controlled device to implement a corresponding setting of the set of settings to implement the scene.

2. The device controller of claim 1, wherein the intermediary device comprises a second device controller.

3. The device controller of claim 1, wherein the intermediary device comprises a mobile computing device.

4. The device controller of claim 1, wherein the one or more controlled devices includes a second controlled device, and wherein the intermediary device comprises the second controlled device.

5. The device controller of claim 1, wherein the one or more processors transmit the first scene command to the first controlled device by:
communicating with the intermediary device to cause the intermediary device to form the mesh bridge to the first controlled device using a second intermediary device.

6. The device controller of claim 5, wherein the second intermediary device is outside a given range of the wireless transceiver of the device controller.

7. The device controller of claim 5, wherein the second intermediary device comprises a load control device that controls a power output on a load line of the first controlled device.

8. The device controller of claim 1, wherein the memory of the device controller includes a database that stores multiple scenes, each scene of the multiple scenes specifying a corresponding set of settings for a corresponding set of controlled devices, and wherein the one or more processors select the scene from the multiple scenes based on the detected sensing event.

9. The device controller of claim 8, wherein one or more sensors of the device controller include a set of touch sensors coupled to an exterior panel of the device controller, and wherein the control module utilizes the set of touch sensors to detect and interpret a touch input on a surface of the exterior panel to select the scene from the multiple scenes.

10. The device controller of claim 8, wherein one or more sensors of the device controller include at least one of a proximity sensor or a presence sensor, and wherein the control module uses an output of the at least one of the proximity sensor or the presence sensor to select the scene from the multiple scenes.

11. A non-transitory computer readable medium storing instructions that, when executed by one or more processors of a device controller, cause the device controller to:
determine a scene corresponding to a set of settings for one or more controlled devices; and
transmit a set of scene commands to the one or more controlled devices to cause the one or more controlled devices to implement the scene;
wherein the one or more processors transmit a first scene command of the set of scene commands to a first controlled device of the one or more controlled devices by:
communicating with an intermediary device to form a mesh bridge to the first controlled device, the intermediary device including a wireless hub and being in direct communication with its own local network of smart home devices that does not include the device controller; and
transmitting the first scene command to the first controlled device using the mesh bridge, the first scene command causing the first controlled device to implement a corresponding setting of the set of settings to implement the scene.

12. The non-transitory computer readable medium of claim 1, wherein the intermediary device comprises a second device controller.

13. The non-transitory computer readable medium of claim 11, wherein the intermediary device comprises a mobile computing device.

14. The non-transitory computer readable medium of claim 11, wherein the one or more controlled devices includes a second controlled device, and wherein the intermediary device comprises the second controlled device.

15. The non-transitory computer readable medium of claim 11, wherein the instructions, when executed by the one or more processors, further cause the device controller to:
transmit the first scene command to the first controlled device by:
communicate with the intermediary device to cause the intermediary device to form the mesh bridge to the first controlled device using a second intermediary device.

16. The non-transitory computer readable medium of claim 15, wherein the second intermediary device is outside a given range of a wireless transceiver of the device controller.

17. The non-transitory computer readable medium of claim 15, wherein the second intermediary device comprises a load control device that controls a power output on a load line of the first controlled device.

18. The non-transitory computer readable medium of claim 11, wherein the memory of the device controller includes a database that stores multiple scenes, each scene of the multiple scenes specifying a corresponding set of settings for a corresponding set of controlled devices, and wherein the instructions, when executed by the one or more processors, cause the device controller to select the scene from the multiple scenes based on the detected sensing event.

19. The non-transitory computer readable medium of claim 18, wherein the device controller includes a set of touch sensors coupled to an exterior panel of the device controller, and wherein the instructions, when executed by the one or more processors, cause the device controller to use the set of touch sensors detect and interpret a touch input on a surface of the exterior panel to select the scene from the multiple scenes.

20. A computer-implemented method of operating controlled devices, the method being performed by one or more processors of a device controller and comprising:
determining a scene corresponding to a set of settings for one or more controlled devices; and
transmitting a set of scene commands to the one or more controlled devices to cause the one or more controlled devices to implement the scene;

wherein the one or more processors transmit a first scene command of the set of scene commands to a first controlled device of the one or more controlled devices by:
  communicating with an intermediary device to form a mesh bridge to the first controlled device, the intermediary device including a wireless hub and being in direct communication with its own local network of smart home devices that does not include the device controller; and
  transmitting the first scene command to the first controlled device using the mesh bridge, the first scene command causing the first controlled device to implement a corresponding setting of the set of settings to implement the scene.

* * * * *